July 8, 1930.  O. E. SZEKELY  1,769,974
PISTON RING
Filed Aug. 3, 1927
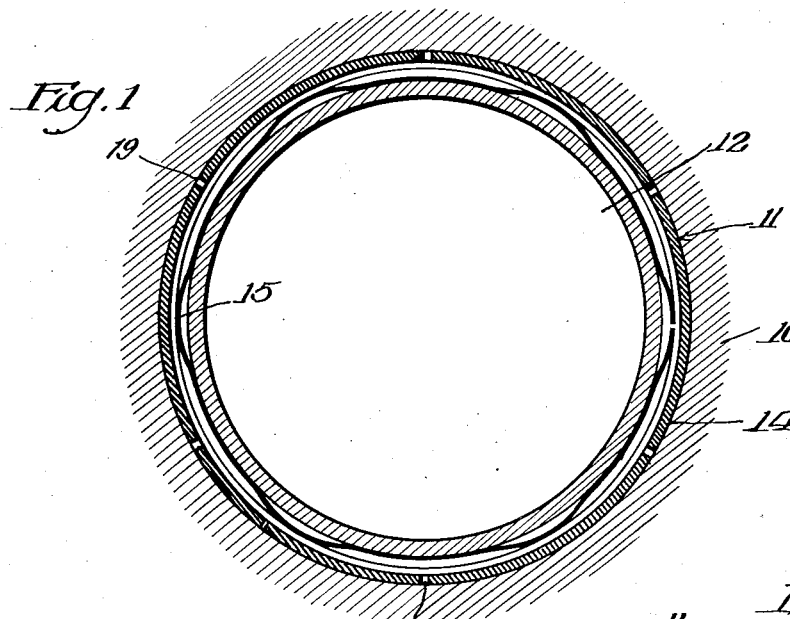
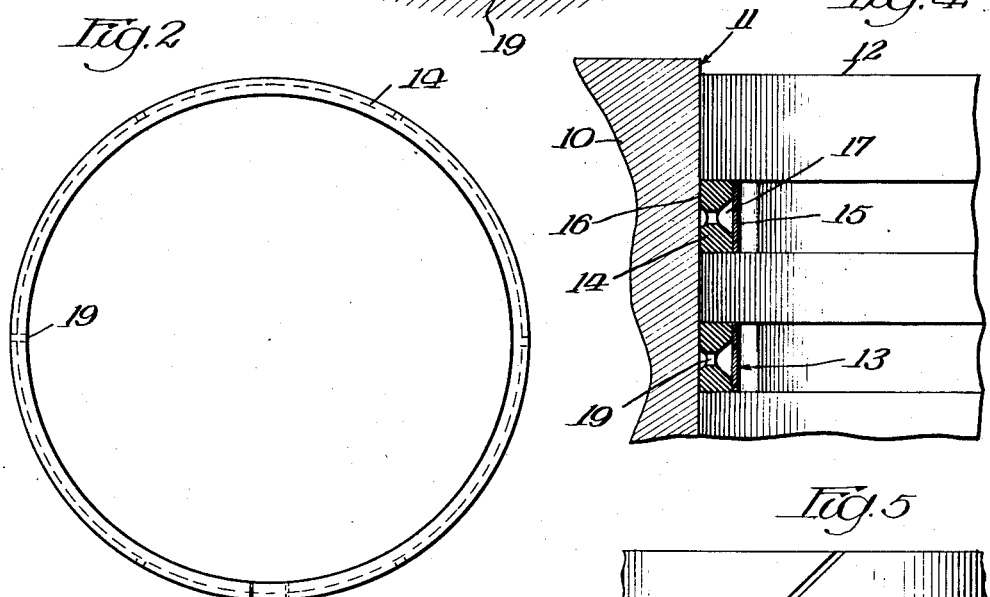
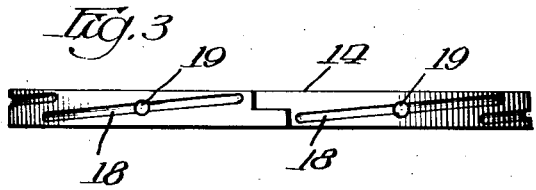
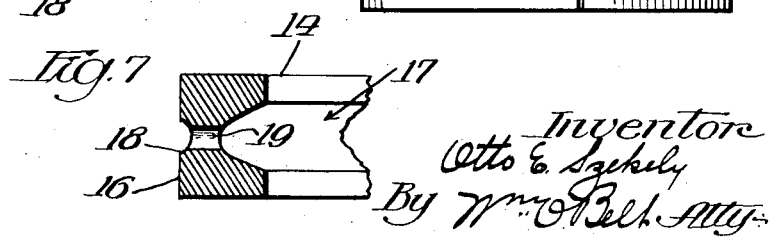
Inventor
Otto E. Szekely
By Wm O Bell Atty Patented July 8, 1930

1,769,974

UNITED STATES PATENT OFFICE

OTTO E. SZEKELY, OF HOLLAND, MICHIGAN

PISTON RING

Application filed August 3, 1927. Serial No. 210,289.

This invention relates to piston rings in general, and particularly to piston rings which are adapted to be used in conjunction with an inner ring.

The object of the invention is to provide a piston ring which is adapted to conform itself with the contour of the cylinder and which will maintain an even pressure against the cylinder walls throughout its entire periphery.

Another object is to provide a piston ring which is substantially dead or non-resilient, whereby an even pressure is exerted against the cylinder walls throughout the periphery of the ring by means of a resilient or springy inner ring.

Another object is to provide a piston ring which will insure against loss of compression and oil pumping and which is adapted to fit cylinders which have become worn out of round.

And another object is to provide a piston ring which will maintain its normal initial wall pressure at all times.

The accompanying drawing is a selected embodiment of the invention and the views therein are as follows:

Fig. 1 is a detail plan view showing a cylinder and piston with my invention incorporated therewith.

Fig. 2 is a plan view of the outer ring.

Fig. 3 is a side view of the outer ring.

Fig. 4 is a detail sectional view through a cylinder showing the inner and outer ring in section.

Figs. 5 and 6 are enlarged detail views of a step cut ring and an angle cut ring respectively.

Fig. 7 is an enlarged detail sectional view through the outer ring.

Referring to the drawings 10 designates an engine block provided with the conventional cylinder chambers 11 in which the piston 12 operates. The piston is provided with the usual piston ring grooves 13 in which the outer ring 14 and the inner ring 15 are arranged. The outer ring 14 has a face 16 which bears against the cylinder walls and the opposite face is grooved as at 17, Fig. 7. The inner ring 15 is arranged within the grooves 13 between the piston and the outer ring as clearly shown in Fig. 4.

The outer ring is made dead or substantially non-resilient while the inner ring is made of live, springy material and exerts a continual equal pressure throughout the entire periphery of the outer ring.

The conventional type of outer piston ring is substantially springy and resilient and is adapted to exert a pressure of from five to eight pounds a square inch or about sixteen and a half pounds wall pressure for a ring three and a half inches in diameter by one-quarter inch wide. This pressure is apparent only when the ring is new and is sufficient to insure against loss of compression and oil pumping. However, it is a known fact and tests show that the conventional ring very soon loses its resiliency and the wall pressure becomes reduced due to the high temperatures to which the rings are exposed and causes oil pumping and loss of compression.

By using a substantially dead or non-resilient outer ring and a live inner ring spring those defects will be overcome. The temperature within the cylinder will have no effect on a dead ring and the inner ring is sufficiently removed from the heat to be unaffected thereby and will always maintain its resiliency. Furthermore, an even pressure is maintained throughout the entire circumference of the ring and being dead, or substantially so, is adapted to conform itself to the shape of the cylinder. Tests have proven that the use of a dead outer ring and a live inner ring spring will maintain the initial maximum wall pressure indefinitely and in actual practice it has been found that complete contact of the ring with the cylinder walls throughout the entire periphery of the ring is maintained even when the cylinder is .015 of an inch out of round.

The rings may be of the types known as step cut, Fig. 5, or angle cut, Fig. 6, although it has been found preferable to use the angle cut ring as that type of ring needs only to be compressed one-thirty-second of an inch to insert it in the cylinder, which pressure set up would be practically nil, while the step cut ring would have to be compressed approximately three-sixteenths of an inch. However, either type may be successfully employed. While any type of an inner ring spring may be employed to furnish the necessary pressure on the outer ring, I prefer to use an inner ring as is set forth in my Patent No. 1,683,269, issued September 4, 1928, in order to procure the very best results and to maintain the most even pressure on the outer ring.

The ring 14 may be provided with a plurality of diagonal overlapping shallow grooves 18 on its outer face, Fig. 3, for the purpose of wiping the oil from the cylinder wall during the travel of the piston. Such oil as may be picked up is delivered through the holes 19 which extend transversely through the ring, to the groove 17. This oil may flow from the groove through the piston in cases where the piston is provided with holes for such purposes. The groove 17 provides means for distributing the oil about the inner ring and also tends to reduce the inertia effect of the ring.

Changes may be made in the form, construction and arrangement of the parts without departing from the spirit and without sacrificing the advantages of the invention and I reserve the right to make all such changes as fairly fall within the scope of the following claims.

I claim:

1. A piston ring having grooves upon its outer face and a groove upon its inner face, and a hole through the ring connecting each outer groove with the inner groove, said outer grooves being diagonally disposed and with their end portions overlapped, the holes through the ring being at substantially the mid length of the grooves.

2. A piston ring having a plurality of grooves distributed around its outer face, a continuous groove upon its inner face, and a hole connecting each outer groove with the inner groove, said outer grooves being diagonally disposed, and a spring ring bearing against the inner face of the piston ring and bridging said inner groove.

OTTO E. SZEKELY.